Aug. 15, 1933.     H. M. SMITT     1,922,717
MECHANISM FOR FEEDING FRAGILE OBJECTS TO MACHINES
Filed Feb. 6, 1931     2 Sheets-Sheet 1
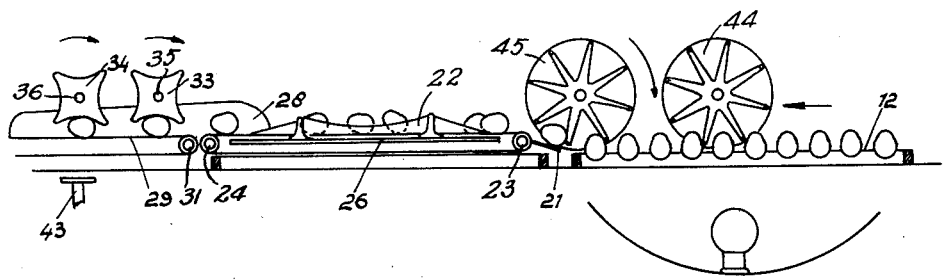
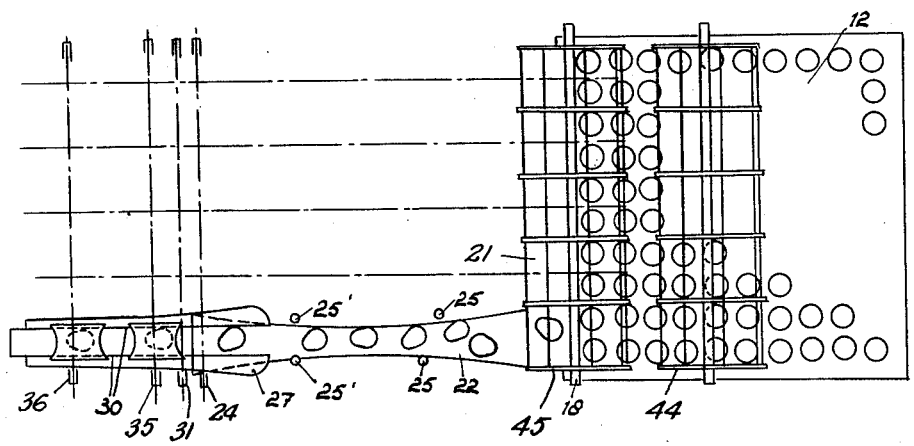
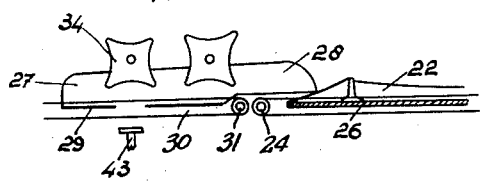
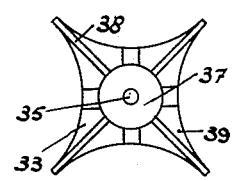
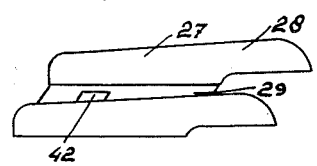
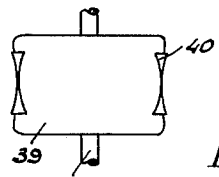
Inventor
Hermanus Mattheus Smitt
per [signature]
Attorney Aug. 15, 1933.  H. M. SMITT  1,922,717
MECHANISM FOR FEEDING FRAGILE OBJECTS TO MACHINES
Filed Feb. 6, 1931   2 Sheets-Sheet 2
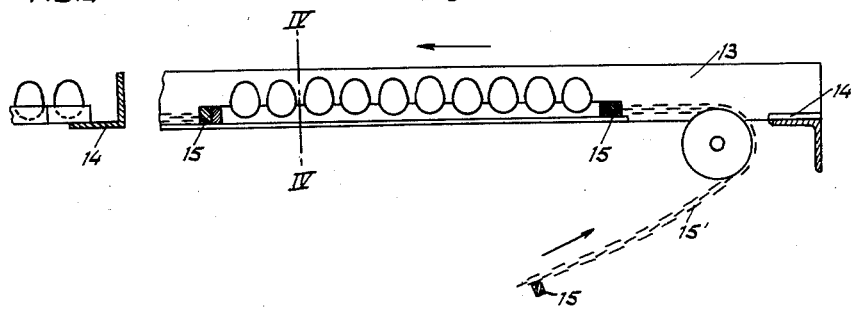
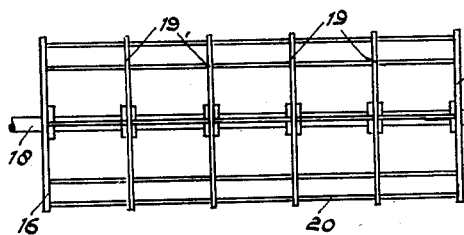
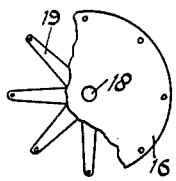
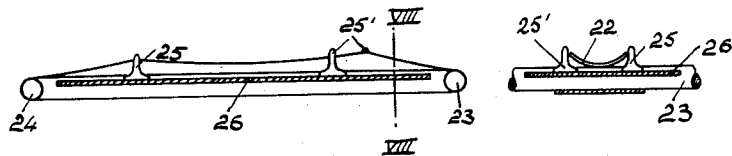
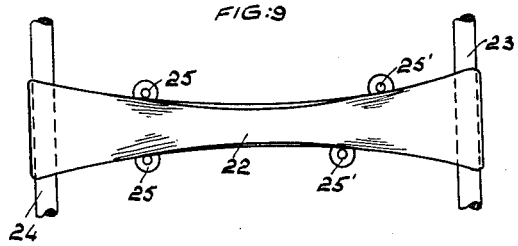
Inventor
Hermanus Matthews Smitt
per  Attorney Patented Aug. 15, 1933

1,922,717

UNITED STATES PATENT OFFICE 1,922,717

MECHANISM FOR FEEDING FRAGILE OBJECTS TO MACHINES

Hermanus Mattheus Smitt, Bilthoven, Netherlands

Application February 6, 1931, Serial No. 514,022, and in the Netherlands February 19, 1930

6 Claims. (Cl. 198—25)

This invention relates to means for feeding fragile objects such as eggs, fruit and the like, which are easily broken or damaged, to grading, sorting or other machines for further treatment.

One object of the invention is to provide a feeding mechanism for fragile objects as indicated by which the objects are separately passed along in spaced manner, so that no object thus fed can come into contact with another or suffer damage from such contact.

Another object is to eliminate handling of the fragile articles by hand and the slow process of placing said objects one at a time by hand on a conveyer.

A further object is to provide a feeding mechanism which may be enlarged so as to simultaneously deliver several objects separately, by merely increasing the number of feeding units, each unit including conveyors and auxiliary means.

Yet another object is to have a feeding mechanism which can accommodate a great number of objects upon frames or trays by which also the objects be readily transported, the placing of the objects on said trays being independent of the operating speed of the feeding machine, the trays having but to be placed on a conveyor.

A still further object is to accelerate the feeding of the fragile objects to the grading or other subsequent machine by automatic operation as against manipulation by hand during the feeding operation.

It is also an object to have the machine feed the fragile objects in one direction, that is, in the direction corresponding with that of the feeding movement and also to transfer said objects in a straight row properly spaced and directed to the subsequent machine for grading, sorting, etc.

Other objects and the various advantages inherent in the invention will appear more fully as the specification proceeds.

In the accompanying drawings forming part hereof.

Figure 1 is a side elevation which diagrammatically illustrates an apparatus embodying the invention and disclosing certain operative features and relations of parts thereof.

Figure 2 is a plan view of the same apparatus showing one of a series of fine grading devices of the same.

Figure 3 is a vertical longitudinal section through the feeding end of the apparatus with a tray of eggs placed thereon.

Figure 4 is a partial vertical cross section on the line IV—IV of Figure 3.

Figure 5 is a front elevation of a device which is adapted to properly dispose disarranged eggs in a row, and is positioned above plates where the eggs are advanced from a tray to conveyor belts and to raise the eggs from the tray to the conveyor belts.

Figure 6 is an end elevation of the apparatus shown in Figure 5.

Figure 7 is a side elevation of a conveyor band on which the eggs are placed when they have left the tray, the supporting plate being shown in cross section.

Figure 8 is a cross section on the lines VIII—VIII on Figure 7.

Figure 9 is a plan view of the device shown in Figure 7.

Figure 10 is a side elevation of the rear end of the transport band shown in Figure 9 together with the transport device with egg spacing wheels.

Figure 11 is a perspective view of the guide trough in which the eggs are spaced.

Figure 12 is a side elevation of one of the egg spacing wheels and

Figure 13 is a plan view corresponding to Figure 12.

It may be noted that it is designed in this invention to make it easily possible to resiliently arrange a rotary stamp roller below one of the conveyor belts of the apparatus for stamping the eggs passed and may also include a lamp for testing.

In the practice of my invention, the trays in which the eggs are placed for transport are placed on the feeding apparatus. As the tray advances successive transverse rows are lifted from the tray whereby the eggs are placed in pairs on a following conveyor belt, where they are then placed behind one another in the direction of movement and in a row in the direction of movement of the conveyor. As may be seen from Figure 2 there are arranged five conveyor belts on which the ten rows are combined into five rows, but only one of the five conveyor belts is shown with the following apparatus for directing and spacing the eggs.

As may be seen in the first views, trays 12, each with 100 eggs, are fed one after another to the apparatus at the right hand side, being placed between angle bars 13 which form the side of the frame in which the different mechanisms are mounted, one of the said bars 13 being shown in Figures 3 and 4. Each tray is placed on the horizontal flanges 14 of the angle bars and between blocks 15 connected to two endless chains which are driven at a suitable speed in the direction of the arrows. (Figure 3). During the movement of the tray along the horizontal flanges 14 the eggs may be tested in any known manner as for example by means of a lamp arranged under the trays in the feeding apparatus. The trays come during their movement first under a directing device 44 shown in Figures 5 and 6 which consists of an axis 18 on which discs 16 and 17 are arranged and also four starwheels 19 in such a manner that the space between the discs 16 and 17 is divided by the starwheels in five equal parts.

The starwheels are provided with eight fingers and are mounted rigidly on the axis 18 in such a manner that the fingers of the different starwheels lie in axial alignment. The resulting directing device is arranged in such a manner above the conveyor member for the trays and is driven at such a speed in a clockwise direction (Figure 1) that the eggs are directed or positioned in alinement with the general line of movement in the advancing tray. Next to the directing device 44 above described is arranged at the left hand side a second directing device 45 which is rotated in the same direction as the first mentioned device. This directing device also consists of several star wheels which are arranged on a common axis: but the ends of the fingers are connected by resilient bands or bars so that a rotary cage or starwheel 45 is formed. This cage, although generally similar to 44, however, serves for a quite different object, viz. to lift the eggs out of the trays as they arrive at the plate 21 and to advance them over the plate 21 to the conveyer belts 22. The trays are moved close to and under the plate 21 so that the eggs can easily be taken from the tray thereby and be placed on the plate by riding up on the same as shown in the first view. On the conveyor belts 22, which may be several in number arranged adjacent each other, but only one of which is shown in full, two rows of eggs are combined into one row so that the original ten rows of eggs are merged into five rows, each row of which is handled in the same manner in the apparatus. It is therefore sufficient to describe only one row of the mechanism to which the eggs are brought.

The conveyor belts 22 are endless bands preferably of resilient material such as rubber. This band runs over rollers mounted on spindles 23 and 24 of which spindle 24 is driven. In order to prevent the eggs from running off the band pins 25, 25', preferably of conical form, are arranged on the plate 26 (Figures 7 and 8) situated under the upper stretch of the conveyor belt. The pins 25 and 25' are arranged in such a manner that the edges of the belt are turned upwards as shown in Figures 7 and 8. Besides this the pins 25, and 25' are not placed in the same transverse plane, but are arranged in staggered formation so that two eggs which might at the same time be moved on to the belt by the cage, are not caught together between the pins and consequently crushed, but are placed approximately one behind the other in the direction of movement.

In order to lead the eggs which are advancing on the conveyor belt 22 and also those that have been advanced to the next following conveyor transport device a guide member or trough 27 (Figure 10) is arranged in such a manner that the inclined side wings 28 thereof extend slightly above the conveyor belt 22 whilst the bottom portion 29 extends under the upper part of the next conveyor transport member for the eggs.

This next conveyor transport member forms in effect a continuation of the conveyor belt 22 and consists of two stretchable cords 30 running over rollers mounted on spindles 31, one of which is not shown. The two parallel stretchable cords are placed so far from one another that the eggs rest thereon with their longitudinal axes parallel to the direction of movement. In order to space the eggs accurately at the same distance from each other as is necessary for bringing the eggs in a suitable manner into the grading device, the following apparatus is used. Above the conveyor transport cords 30 are arranged two spacing wheels 33 and 34 carried respectively on spindles 35 and 36 (Figs. 1, 2, 12 and 13). These spacing wheels are driven in the direction shown by the arrows in Figure 1, with the same circumferential speed as the conveyor transport member 30. Said wheels are spaced from one another at a distance equal to the distance at which it is desired to space the eggs. The wheels are therefore arranged on spindles 35 and 36 and consist of a boss 37 (Figure 12) with four sprockets 38 of equal length and equally spaced at 90 degrees. The ends of these sprockets are connected by means of bent plates 39, curved according to the form of the eggs. The height of the wheel above the conveyor transport members 30 is such that the eggs are snugly engaged between the curved plate and the conveyor transport members 30. The ends of the sprocket 38 of the spacing wheels are provided with rollers 40, the object of which is to prevent damage to the eggs when engaged by the spacing wheel.

Now it may happen that the first spacing wheel, that is, the wheel on the spindle 35, strikes one or more eggs near its centre since the eggs, when they reach this wheel, are not yet spaced. The first spacing wheel 33 is therefore mounted resiliently on its spindle 35 in such a manner that it can move with relation to the spindle 35 in a direction opposite to that in which it is driven. The result is that, in case one of the arms of the spacing wheel 33 strikes an egg in an unfavorable manner, the spindle 35 which rotates at a constant speed will thus allow the spacing wheel to adjust itself during the progressive movement of the eggs. The second spacing wheel 34 is mounted rigidly on its spindle 36 and consequently places the eggs which were approximately spaced correctly in accurate spaced position from one another.

In order to provide the eggs with a date or mark there may be provided an opening 42 (Figs. 10 and 11) in the bottom of the trough 27 beneath the second spacing wheel 34 and a stamping device 43 (Fig. 1) may be arranged under said opening 42 which can be automatically moved upwards at the moment an egg is exactly under the spacing wheel 34. This dating or stamping may also be obtained by means of a resilient date-roll or stamp-roll rotating in the plane of movement of the conveyor transporting members 30. As the eggs are spaced and directed, an equal and correct marking of the eggs is obtained.

What I claim is:

1. A feeding device of the character described, for feeding a series of separate fragile objects to a machine, including the combination, with means for presenting a plurality of said objects in successive transverse rows to the device, of a feeding wheel adapted to engage successive rows of said objects, a stationary lifting plate disposed adjacent to said feeding wheel in the path of said objects in order to raise single transverse rows thereof in succession and direct the objects forward, a conveyor receiving said objects from said lifting plate and merging transverse rows thereof into a single line of objects directed in the feeding direction and feeding said single line forward, and means for receiving said line of objects from said conveyor and spacing the individual objects apart while feeding the same forward.

2. A feeding device of the character described, for feeding a series of separate fragile objects to a machine, including the combination, with means for presenting a plurality of said objects in successive transverse rows to the device, of a pair of feeding wheels adapted to successively engage transverse rows of said objects, a stationary lifting plate disposed adjacent to one of said feeding wheels in the path of said objects in order to raise single transverse rows thereof in succession and direct the individual objects forward, a conveyor receiving said objects from said lifting plate and having flexible side edges which are raised to rearrange said rows into a single line of objects directed in the feeding direction, and means receiving said line of objects from said conveyor and spacing the individual objects apart at regular intervals while feeding the same forward.

3. A feeding device of the character described, for feeding a series of separate fragile objects to a machine, including the combination, with means for presenting a plurality of said objects in successive transverse rows to the device, of a feeding wheel adapted to engage successive rows of said objects, a stationary lifting plate disposed adjacent to said feeding wheel in the path of said objects in order to raise single transverse rows thereof in succession and direct the objects forward, a conveyor receiving said objects from said lifting plate and merging transverse rows thereof into a single line of objects directed in the feeding direction and feeding said single line forward, a second conveyor receiving said line of objects from the first conveyor and feed the same forward, and spacing wheels cooperating with said second conveyor and spacing the individual objects thereon apart at predetermined intervals while being fed forward.

4. A feeding machine of the character described adapted to feed a plurality of objects to a machine in rows arranged transverse to the direction of feeding, including the combination, with a movable tray for presenting a plurality of said objects in a succession of rows, of a feeding wheel adapted to engage successive rows of said objects, raising means disposed adjacent to said feeding wheel cooperating therewith to effect successive removal of each transverse row of said objects and directing forward of the same, means for receiving and merging said directed rows into single parallel lines of directed objects and conveying the same forward in directed single lines disposed in the feeding direction, and means spacing the individual directed objects at regular intervals along said lines, while feeding said objects forward.

5. A feeding machine of the character described adapted to feed a plurality of objects to a machine in rows arranged transverse to the direction of feeding, including the combination, with a movable tray for presenting a plurality of said objects in a succession of rows, of a feeding wheel adapted to engage successive rows of said objects, stationary means cooperating with said wheel disposed in the path of said objects and raising each row in succession and simultaneously directing forward the objects in each row in the feeding direction, a plurality of conveyors disposed adjacent to said stationary means for receiving and feeding forward the objects from said means and effective to rearrange said transverse rows into single parallel lines of objects, and means for spacing the individual objects apart at predetermined intervals in said lines while feeding the same forward.

6. A feeding machine of the character described adapted to feed a plurality of objects to a machine in rows arranged transverse to the direction of feeding, including the combination, with a movable tray for presenting a plurality of said objects in a succession of rows, of feeding wheels adapted to engage successive rows of said objects, raising means cooperating with one of said wheels disposed in the path of said objects and raising each row in succession and simultaneously directing forward the objects in each row in the feeding direction, a plurality of conveyors disposed adjacent to said stationary means for receiving and feeding forward the objects from said means and effective to rearrange said transverse rows into single parallel lines of objects, and means including spacing wheels for spacing the individual objects apart at predetermined intervals in said lines while feeding the same forward.

HERMANUS MATTHEUS SMITT.